(12) United States Patent
Aldabaibeh et al.

(10) Patent No.: US 9,540,287 B2
(45) Date of Patent: Jan. 10, 2017

(54) PARTICLE STABILIZED FOAM, AND SLURRIES, PRODUCT, AND METHODS RELATED THERETO

(71) Applicant: United States Gypsum Company, Chicago, IL (US)

(72) Inventors: Naser Aldabaibeh, Homer Glen, IL (US); Kumar Natesaiyer, Grayslake, IL (US); Ashish Dubey, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 120 days.

(21) Appl. No.: 14/030,398

(22) Filed: Sep. 18, 2013

(65) Prior Publication Data

US 2014/0272376 A1    Sep. 18, 2014

Related U.S. Application Data

(60) Provisional application No. 61/780,410, filed on Mar. 13, 2013.

(51) Int. Cl.
*C04B 38/10* (2006.01)
*C04B 28/14* (2006.01)
(Continued)

(52) U.S. Cl.
CPC ........... *C04B 38/10* (2013.01); *B29D 99/0021* (2013.01); *C04B 28/02* (2013.01); *C04B 28/14* (2013.01);
(Continued)

(58) Field of Classification Search
CPC ............ C04B 7/02; C04B 28/14; C04B 38/10; C04B 11/00; B32B 13/00; B32B 37/00
(Continued)

(56) References Cited

U.S. PATENT DOCUMENTS 3,619,221 A * 11/1971 Kossivas ................. C04B 24/12
106/727
4,350,533 A *  9/1982 Galer ...................... C04B 7/323
106/695
(Continued)

FOREIGN PATENT DOCUMENTS

EP     2361679    8/2011
EP     2460585    6/2012
(Continued)

OTHER PUBLICATIONS

"Stabilization of Foams with Inorganic Colloidal Particles", Gonzenbach et al., Langmuir (2006), 10983-10988.*
(Continued)

*Primary Examiner* — Paul Marcantoni
(74) *Attorney, Agent, or Firm* — Leydig, Voit & Mayer, Ltd.; Philip T. Petti; Pradip K. Sahu

(57) ABSTRACT

Disclosed are cementitious product, as well as cementitious slurry, and method of forming the product. To reduce density in the cementitious product, foam is included in the slurry and in the method of forming the product. The slurry includes cementitious particles, water, and air bubbles such as from compressed air. Instead of using detergent chemistry at the gas/water interface of bubbles, the present invention uses a surface modifying agent for the cementitious particles in the slurry. The modified particles act to produce stable foam in the slurry. As an example mode of introduction, the surface modifier can be added (e.g., as solid or solution) directly into a bulk cementitious slurry that forms the product. As another example, the surface modifier can be added in a separate solution with water, air bubbles, and cementitious particles that serve as additive to the main cementitious slurry, where the separate solution is then added to the main cementitious slurry.

8 Claims, 4 Drawing Sheets

(51) Int. Cl.
| | | |
|---|---|---|
| C04B 11/00 | (2006.01) | |
| B29D 99/00 | (2010.01) | |
| E04B 1/16 | (2006.01) | |
| C04B 28/02 | (2006.01) | |

(52) U.S. Cl.
CPC ...... *E04B 1/167* (2013.01); *Y10T 428/249968* (2015.04)

(58) Field of Classification Search
USPC .......................................... 106/778; 156/39
See application file for complete search history.

(56) References Cited

U.S. PATENT DOCUMENTS

| | | | |
|---|---|---|---|
| 4,804,688 | A | 2/1989 | Vassileff |
| 5,683,635 | A | 11/1997 | Sucech et al. |
| 6,494,609 | B1 | 12/2002 | Wittbold et al. |
| 6,620,487 | B1 | 9/2003 | Tonyan et al. |
| 6,743,830 | B2 | 6/2004 | Soane et al. |
| 6,805,741 | B1 | 10/2004 | Liu et al. |
| 6,874,930 | B2 | 4/2005 | Wittbold et al. |
| 7,754,006 | B2 | 7/2010 | Liu et al. |
| 7,851,057 | B2 | 12/2010 | Englert et al. |
| 8,030,377 | B2 | 10/2011 | Dubey et al. |
| 8,061,257 | B2 | 11/2011 | Tonyan et al. |
| 8,361,221 | B2 * | 1/2013 | Andreani et al. ............. 106/728 |
| 9,028,610 | B2 * | 5/2015 | Pardal ....................... C04B 7/02 106/602 |
| 2002/0017222 | A1 | 2/2002 | Luongo |
| 2004/0187741 | A1 | 9/2004 | Liu et al. |
| 2007/0048490 | A1 | 3/2007 | Yu et al. |
| 2008/0090068 | A1 | 4/2008 | Yu |
| 2008/0229981 | A1 | 9/2008 | Liu et al. |
| 2009/0239977 | A1 | 9/2009 | Dubey et al. |
| 2009/0325780 | A1 | 12/2009 | Gauckler et al. |
| 2010/0229715 | A1 | 9/2010 | Tonyan et al. |
| 2012/0165827 | A1 | 6/2012 | Khairkhahan et al. |
| 2012/0170403 | A1 | 7/2012 | Li et al. |
| 2012/0172469 | A1 | 7/2012 | Perez-Pena |

FOREIGN PATENT DOCUMENTS

| | | |
|---|---|---|
| WO | WO 2009085635 | 7/2009 |
| WO | WO 2009/112647 A2 * | 9/2009 |
| WO | WO 2013/017391 A1 * | 2/2013 |

OTHER PUBLICATIONS

Stabilization of Foams with Inorganic Colloidal Particles, Gonzenbach et al., Langmuir (2006), 10983-10988 (abstract).*
WO 2009/112647 A2 Vigne et al. (abstract).*
Additive for reducing Cr6+ ions into Cr3+ cations, Andreani et al. U.S. Pat. No. 8361221 (abstract).*
JP 01153561 A (Jun. 15, 1989) Uchida et al. (abstract).*
Abkarian et al., Dissolution Arrest and Stability of Particle-Covered Bubbles, *Phys. Rev. Lett.*, 99: 188301-1-188301-4 (2007).
Ametov et al.; Hydrophobic Interactions in Concentrated Colloidal Suspensions: A Rheological Investigation, *J. Phys. Chem. B*, 108: 12116-12122 (2004).
Binks, Particles as surfactants—similarities and differences, *Curr. Opin. Colloid. In.*, 7: 21-41 (2002).
Cui et al., Aqueous Foams Stabilized by in Situ Surface Activation of $CaCo_3$ Nanoparticles via Adsorption of Anionic Surfactant, *Langmuir*, 26: 12567-12574 (2010).
Du et al., Outstanding Stability of Particle-Stabilized Bubbles, *Langmuir*, 19: 3106-3108 (2003).
Gonzenbach et al., Macroporous Ceramics from Particle-Stabilized Wet Foams, *J. Am. Ceram. Soc.*, 90: 16-22 (2007).
Gonzenbach et al., Stabilization of Foams with Inorganic Colloidal Particles, *Langmuir* 2006, 22: 10983-10988.
Gonzenbach et al.; Tailoring the Microstructure of Particle-Stabilized Wet Foams, *Langmuir*, 23: 1025-1032 (2007).
Gonzenbach et al., Ultrastable Particle-Stabilized Foams, *Angew. Chem. Int. Ed.* 45: 3526-3530 (2006).
Horozov, Foams and foam films stabilised by solid particles, *Curr. Opin. Colloid. In.*, 13: 134-140 (2007).
Kam et al., Anomalous Capillary Pressure, Stress, and Stability of Solids-Coated Bubbles, *Curr. Opin. Colloid. In.*, 213: 329-339 (1999).
Kim et al., Intense and selective coloration of foams stabilized with functionalized particles, *J. Mater. Chem.* 19: 7043-7049 (2009).
Martinez et al., On the origin of the remarkable stability of aqueous foams stabilised by nanoparticles: link with microscopic surface properties, *Soft Matter*, 4: 1531-1535 (2008).
Menner et al., Particle-Stabilized Surfactant-Free Medium Internal Phase Emulsions as Templates for Porous Nanocomposite Materials: poly-Pickering-Foams, *Langmuir*, 23: 2398-2403; (2007).
Salager, Surfactants: Types and Uses, FIRP Booklet E300-A, 50 pages; Universidad de los Andes (2002).
Studart et al.; Materials from foams and emulsions stabilized by colloidal particles; *J Mater. Chem*; 17: 3283-3289; 2007.
Subramanian et al., Microstructure, morphology and lifetime of armored bubbles exposed to surfactants, *Langmuir*, 14: 5986-5890 (2006).
Wege et al., Long-Term Stabilization of Foams and Emulsions with In-Situ Formed Microparticles from Hydrophobic Cellulose, *Langmuir*; 24: 9245-9253 (2008).
Wong et al., Controlling Phase Distributions in Macroporous Composite materials through Particle-Stabilized Foams, *Langmuir*, 27: 3254-3260 (2011).
Zeng et al.; Particles on droplets: From fundamental physics to novel materials, *Solid State Comm.*, 139: 547-556 (2006).
Zhang et al.; Aqueous foams stabilized with particles and nonionic surfactants, *Colloids and Surfaces A: Physicochem, Eng. Aspects*, 324: 1-8 (2008).
European Patent Office as ISA, International Search Report and Written Opinion from PCT/US2014/023305 (May 26, 2014).

* cited by examiner

PARTICLE STABILIZED FOAM, AND SLURRIES, PRODUCT, AND METHODS RELATED THERETO

CROSS-REFERENCE TO RELATED APPLICATIONS

This patent application claims the benefit of U.S. Provisional Patent Application No. 61/780,410, filed Mar. 13, 2013, which is incorporated by reference in its entirety.

BACKGROUND OF THE INVENTION

Various cementitious materials are known to be used to prepare a number of different construction products. The cementitious material is normally combined with water and other additives as desired to form a cementitious slurry. The cementitious material is either reacted with water in a hydration reaction to allow for setting to occur in a desired shape, or the water is otherwise dried off to allow the aqueous cementitious slurry to harden in the desired geometry. Examples of such cementitious materials include fly ash, Portland cement, stucco (calcium sulfate hemihydrate in alpha or beta forms, or calcium sulfate anhydrite), and various forms of gypsum (calcium sulfate dihydrate), including landplaster and synthetic gypsum (typically as a by-product of flue-gas desulfurization at coal-fired power plants), and the like.

Such cementitious materials are used in forming construction products such as gypsum drywall used for interior walls and ceilings of buildings, acoustical tile, floor underlayments and capping, mold-resistant board, cement board, and exterior sheathing, to name just a few.

To reduce density in various cementitious products, it is known to introduce air bubbles into the cementitious slurry. If kept stable, the air bubbles transform into air voids when the product is dried. The air bubbles can be introduced in the form of foam prepared generally in a foam generation system as known in the art. Detergent, or soap, surfactants are diluted with water and combined with air in such foam generation systems. The detergents are employed to address the stability of the air bubbles by reducing the surface tension of liquid surrounding them. The foam containing air, water, and detergent is then added to the cementitious slurry to reduce density of the final product.

Existing foaming systems for use in preparing cementitious products have not proven to be fully satisfactory. Foam stability is often problematic, as foam can be wasted as bubbles break up in the slurry because of shear forces or contact with solids in the slurry. In addition, it is difficult to deliver other ingredients with the foam because the other ingredients can destroy air bubbles, thereby compromising efficiency in the manufacturing process.

Thus, there remains a desire for new techniques for introducing foam into cementitious slurries for making various construction materials.

BRIEF SUMMARY OF THE INVENTION

In one aspect, the present invention provides slurry for forming a product. The slurry comprises water, cementitious particles, air bubbles, surrounded by walls formed from the water, and surface modifying agent. The surface modifying agent is effective to modify a surface of at least some of the cementitious particles. The modified particles serve to stabilize the air bubbles sufficiently to form air voids in the product.

In another aspect, the present invention provides a foamed cementitious product. The product comprises porous cementitious component, which can be part or all of the product. The cementitious component is formed from slurry comprising water, cementitious particles, air bubbles surrounded by walls formed from the water, and surface modifying agent effective to modify a surface of at least some of the cementitious particles. The modified particles stabilize the air bubbles sufficiently to form air voids in the component.

In another aspect, the present invention provides a foamed gypsum product (e.g., board). The product comprises set gypsum-containing composition comprising an interlocking crystal gypsum matrix. The set gypsum-containing composition is formed from slurry comprising water, stucco particles, air bubbles surrounded by walls formed from the water, and surface modifying agent effective to modify a surface of at least some of the stucco particles. The modified stucco particles stabilize the air bubbles sufficiently to form air voids in the product.

In another aspect, the present invention provides a method of making gypsum board. In the method, water, air bubbles surrounded by walls formed from the water, cementitious particles, surface modifying agent, and optionally other additives are mixed in a slurry. The surface modifying agent is effective to modify a surface of at least some of the cementitious particles. The modified cementitious particles serve to stabilize the air bubbles in the slurry sufficiently to form air voids in the product. The slurry is disposed between a first cover sheet and a second cover sheet to form a board precursor. The board precursor is cut into a board and the board is dried. In some embodiments the cementitious particles that stabilize the air bubbles are stucco particles which undergo the surface modification to effect the bubble stabilization. In other embodiments, heat resistant accelerator particles are used in a pre-mix to stabilize the air bubbles upon the surface modification thereof from association with the surface modifying agent. The pre-mix can then be added to stucco slurry.

In another aspect, the present invention provides a method of introducing a pre-mix of cementitious foamed slurry to a post-mixer aqueous dispersion of calcined gypsum. The cementitious foamed slurry comprises heat resistant accelerator, surface modifying agent, starch and air bubbles with walls formed by the water, wherein the surface modifying agent is effective to modify a surface of at least some of the cementitious particles, such that the modified particles stabilize the air bubbles sufficiently to form air voids in the product. The method comprises forming an aqueous dispersion of calcined gypsum in a mixer chamber. The method also comprises discharging the aqueous dispersion into a discharge apparatus. The cementitious foamed slurry is introduced into the aqueous dispersion within the discharge apparatus.

BRIEF DESCRIPTION OF THE SEVERAL VIEWS OF THE DRAWING(S)

DETAILED DESCRIPTION OF THE INVENTION

Figure 1:
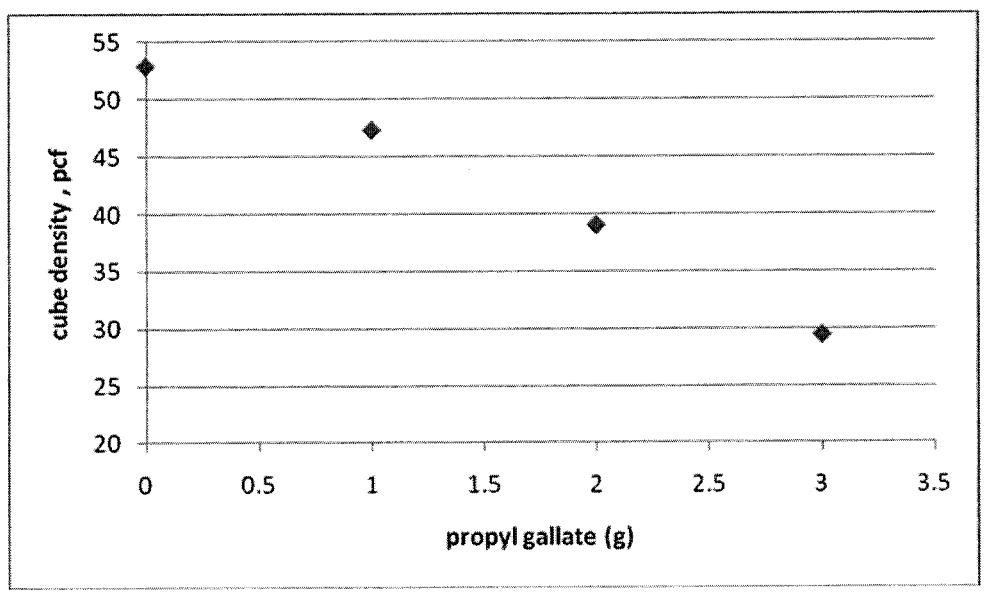
FIG. 1 is a plot of gypsum cube density (pcf) vs. the amount of propyl gallate (g) included in a slurry for forming the gypsum cube, wherein the graph illustrates the effect of the propyl gallate on the density of gypsum cubes in test series described in Example 1, in accordance with embodiments of the invention.

Embodiments of the present invention provide a novel approach for forming and stabilizing foam in cementitious slurries used in preparing cementitious construction products with reduced density. Such slurries normally comprise cementitious material, water, and other additives as desired. The cementitious material is either reacted with water in a hydration reaction to allow for setting to take place (with excess water dried off, e.g., in a kiln), or the water is otherwise dried off to allow the aqueous cementitious slurry to harden in the desired shape.

The present inventors have found that, surprisingly and unexpectedly, surface modifying agent can be used in aqueous cementitious slurry to advantageously modify surfaces of cementitious particles in the slurry. The modified particles desirably stabilize air bubbles that are introduced into the cementitious slurry. The air bubbles unexpectedly remain stable despite encountering other components and shear in the system. As the water dries off, the foam bubbles become air voids in the resulting product such that the density of the product is reduced. Accordingly, the slurry can be substantially free of detergent surfactants that reduce surface tension at the bubble/water interface in conventional foamed cementitious systems.

The surface modifying agent can be added directly in the main cementitious slurry for forming product, e.g., with the agent in solid or solubilized form without having the agent pre-foamed with cementitious particles such as an additive. Air bubbles also are introduced into the system such that the air bubbles are formed in the main cementitious slurry. In some embodiments, however, the surface modifying agent is combined in an additive slurry with air bubbles and an additive in the form of cementitious particles to form a foam, wherein the foam is pre-mixed (e.g., in foam generator systems as understood in the art) and then added to the main cementitious slurry.

Desirable surface modifying agents in accordance with embodiments of the invention are used to tailor the surface energetics of cementitious particles in the slurry to achieve the foam stability. In particular, the surface energetics of at least some of the cementitious particles in the system can be re-arranged to allow such modified particles to serve as a stabilizer for shells of air bubbles surrounded by liquid in the slurry.

In some embodiments, the surface modifying agent is a hydrophobicity imparting additive. Various hydrophobicity imparting additives can be used, including relatively short amphiphiles such as the class of gallates, described herein. Unlike detergent surfactants, which are small molecules, the cementitious particles are much larger, e.g., generally on the order of hundred microns to millimeter scale. Thus, the surface modifying agent in the form of hydrophobicity imparting additive can associate with the particles in regions. Such hydrophobicity imparting additives can be used to render a hydrophilic cementitious material partially hydrophobic. While not wishing to be bound to any particular theory, it is believed that the cementitious material (e.g., stucco, gypsum, etc) will re-orient itself in the slurry such that the hydrophobic part of the modified particle will become immersed in the air/gas phase of the bubble, while the hydrophilic portion of the particles will be associated with the liquid surrounding the gas phase such that the air bubbles are stabilized. For example, it will be understood that cementitious particles such as stucco, gypsum, and fly ash are hydrophilic, exhibiting relatively low contact angles. As the particles are rendered partially hydrophobic because of the association of the hydrophobicity imparting surface modifying agent, the contact angle will increase for the hydrophobic region of the particles.

For example, in some embodiments the contact angle for a portion of at least some of the particles is increased from a lower angle to an angle of at least about 40 degrees (e.g., at least about 43 degrees, such as at least about 50 degrees), including, but not limited to an increased contact angle from about 40 degrees to about 100 degrees or higher, e.g., from about 40 degrees to about 90 degrees, from about 40 degrees to about 80 degrees, from about 40 degrees to about 70 degrees, from about 40 degrees to about 60 degrees, from about 40 degrees to about 50 degrees, from about 43 degrees to about 100 degrees, from about 43 degrees to about 90 degrees, from about 43 degrees to about 80 degrees, from about 43 degrees to about 70 degrees, from about 43 degrees to about 60 degrees, from about 43 degrees to about 50 degrees, from about 50 degrees to about 100 degrees, from about 50 degrees to about 90 degrees, from about 50 degrees to about 80 degrees, from about 50 degrees to about 70 degrees, or from about 50 degrees to about 60 degrees.

To enhance association of the surface modifying agent with the cementitious particles in some embodiments, the pH of the slurry can be elevated above 7.0. By increasing the pH it will be understood that more negative charge will be present at the cementitious particle surface which will promote association of the particles with the surface modifying agent. For example, in embodiments of the invention, the pH is rendered at least about 7.5, e.g., from about 7.5 to about 12, such as from about 7.5 to about 11, about 7.5 to about 10, about 7.5 to about 9, 7.5 to about 8, about 8 to about 11, about 8 to about 10, or about 8 to about 9. The pH can be achieved and/or maintained by any suitable means. For example, the slurry can be provided with a pH adjustor, which can be any suitable pH-adjusting compound. In some embodiments, the pH adjustor is a base or other alkaline material such as calcium hydroxide, sodium hydroxide, potassium hydroxide, ammonium hydroxide, fly ash or the like, or combinations thereof. The slurry can comprise any suitable amount of pH adjustor provided that a suitable amount is used to achieve and/or maintain the pH within the range described herein.

In some embodiments, the surface modifying agent is in the form of one or more gallate species. For example, in some embodiments, the surface modifying agent is characterized by the following formula:

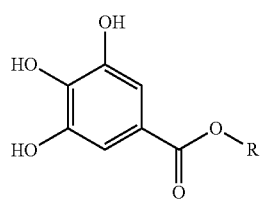

(Formula 1)

In Formula 1, the R is selected from $C_1$-$C_{10}$ alkyl, $C_1$-$C_{10}$ alkenyl, $C_1$-$C_{10}$ alkynyl, $C_3$-$C_{12}$ cycloalkyl, $C_3$-$C_{12}$ cycloalkenyl, or $C_6$-$C_{10}$ aryl, wherein the alkyl, alkenyl, and alkynyl groups are branched or unbranched, and optionally substituted with one or more substituents selected from halo, alkoxy, ester, substituted amide, and the like. In some embodiments, the R group has a relatively small chain length, such as in the form of $C_1$-$C_6$ alkyl, $C_1$-$C_6$ alkenyl, $C_1$-$C_6$ alkynyl, $C_3$-$C_8$ cycloalkyl, $C_3$-$C_8$ cycloalkenyl, $C_6$-$C_8$ aryl, with the same branching and substitution options. In some embodiments, the gallate species is propyl gallate.

The surface modifying agent can be provided in any suitable amount, and the actual amount used will depend on the desired product density as will be appreciated by one of ordinary skill in the art. Desired density will depend on application. For example, acoustical tile can be lighter due to acoustical property (e.g., 10 pcf and higher, such as 10-24 pcf), gypsum drywall can be less than about 35 pcf for lightweight applications but can be higher such as in fire rated products including but not limited to Type X board having density of about 50 pcf or less. Cement board can have density of about 100 pcf or less (e.g., from about 25 pcf to about 80 pcf).

In some embodiments, depending on application and desired density, the surface modifying agent is provided in an amount from about 0.1% to about 7% by weight of the cementitious particles, e.g., from about 0.5% to about 7%, about 1% to about 7%, about 0.1% to about 6%, about 0.5% to about 6%, about 1% to about 6%, about 2% to about 6%, about 2% to about 5%, or about 3% to about 5%. In addition, any suitable foam density can be formed, such as, for example from about 3 pcf to about 50 pcf, e.g., from about 3 pcf to about 40 pcf, about 3 pcf to about 30 pcf, about 3 pcf to about 20 pcf, about 3 pcf to about 10 pcf, about 3 pcf to about 5 pcf (e.g., 3.7 pcf), about 4 pcf to about 50 pcf, about 4 pcf to about 40 pcf, about 4 pcf to about 30 pcf, about 4 pcf to about 20 pcf, about 4 pcf to about 15 pcf, or about 4 pcf to about 10 pcf. It will be understood that the particle stabilized foam of embodiments of the invention can be tailored to form a desired foam void size distribution, average wall thickness between air voids (e.g., at least about 30 microns), and volume ratio of foam voids (voids having a pore size diameter of at least about 5 microns) to evaporated water voids (voids having a pore size diameter of less than 5 microns), e.g., about 0.7:1 to about 9:1. See, e.g., commonly assigned U.S. Patent Publications 2007/0048490 and 2008/0090068.

Because the foam is stabilized by the surface modified cementitious particles, slurry can be substantially free of detergent surfactants that are used conventionally at the water/air interface to reduce surface tension, such as alkyl ether sulfates and/or alkyl sulfates, or other known detergent surfactants. As used herein, "substantially free" of such detergent surfactants means that the slurry for forming cementitious product contains 0 wt. % based on the weight of the cementitious particles, or no such detergent surfactants, or an ineffective or immaterial amount of such detergent surfactants. An example of an ineffective amount is an amount below the threshold amount to achieve the intended purpose of using such detergent surfactant, as one of ordinary skill in the art will appreciate. An immaterial amount may be, e.g., about 0.015% or less, about 0.01% or less, or about 0.001% or less, based on the weight of the cementitious particles, depending on the ingredient, as one of ordinary skill in the art will appreciate.

The particle stabilized foaming technique in accordance with embodiments of the invention can be used with any suitable cementitious material commonly used in making various construction products. Cementitious materials can be of the setting type or the non-setting type. Examples of such cementitious materials include, but are not limited to, fly ash, Portland cement, stucco in its various forms described herein, and calcium sulfate dihydrate from various sources as described herein, and the like. The particle stabilized foaming technique can thusly be used in forming a variety of construction products where reduced density is desired, such as gypsum drywall, acoustical tile, floor underlayments and capping, mold-resistant board, cement board, exterior sheathing, and the like.

In one illustrative aspect, the particle stabilized foaming technique can be used to reduce density in gypsum board used as drywall. Gypsum board is made from stucco slurry where the stucco is transformed into an interlocking matrix of set gypsum crystals via hydration reaction. The stucco is dissolved into the liquid phase where the gypsum particles nucleate and grow. Particle stabilized foam in accordance with the invention can be used to foam the slurry and result in foam voids in the resultant product. Since the foam is believed to initially be stabilized by the surface modifying agent associating with the stucco particles, it is surprising and unexpected that the foam stays stable and does not appreciably collapse even as the stucco dissolves and the gypsum nucleates and grows. While not wishing to be bound by any particular theory, it is believed that, surprisingly, sufficient association with the resulting gypsum particles occurs as other stucco particles dissolve.

The foam can be formed in situ in the slurry, and/or foam can be pre-mixed with water, air bubbles, surface modifying agent and cementitious additive particles and then added to the slurry. For example, in some embodiments, heat resistant accelerator (HRA) can be used as the cementitious additive particles to stabilize the foam, with the foam then added to the stucco slurry. HRA comprises gypsum (calcium sulfate dihydrate) particles which are known as additive in stucco systems to seed and hence accelerate the nucleation of gypsum crystals. As such, HRA is not a setting material since it is already in the dihydrate form. It is customary to coat the calcium sulfate dihydrate particles with one or more of any of a number of known coating agents, such as sugars (e.g., sucrose, dextrose, and the like), starch, boric acid, or long chain fatty acids, and/or salts thereof.

Thus, in some embodiments, a pre-mix of foam is prepared. The pre-mix of foam is formed from HRA, water, surface modifying agent (e.g., hydrophobicity imparting agent such as gallate species, for example, propyl gallate), and pH adjustor as needed. The pre-mix of foam can be prepared, e.g., in foam generator system which can be modified to accommodate the presence of the HRA cementitious material. The pre-mix of foam is added to the slurry and it surprisingly remains highly stable even as stucco dissolves and even upon exposure to shear forces and other components of the slurry. Other components can include dispersants, polyphosphates, starches, etc. For example, in some embodiments, the foam can be added in a discharge conduit downstream of the main mixer chamber of a pin mixer used commonly in wallboard manufacture. In the main mixer, the main aqueous dispersion of calcined gypsum is formed, normally by way of powered mixing (e.g., electrically powered with moving parts including rotor and pins as known in the art), as described in, e.g., U.S. Pat. No. 5,683,635, to agitate the contents thereof under condition with a high degree of agitation.

Since the particle stabilized foam is highly stable, surprisingly, other additives can be added with the pre-foam and then added to the stucco slurry (e.g., in the discharge conduit). For example, in some embodiments, starch can be combined with the HRA, surface modifying agent, and water in the foam pre-mix and then added to the stucco slurry in a post-mixer addition. It is surprising and unexpected that the presence of starch does not collapse foam stabilized by the surface modified HRA particles. This is in contrast with conventional detergent surfactants where the presence of starch in such foaming systems will significantly destroy the foam such that starch could not be added satisfactorily in a post-mixer arrangement.

Any suitable starch can be included. For example, the starch can be pregelatinized, ethylated, acid-modified, and/or enzyme modified. The starch can be included in any suitable amount, such as from about 0.1% to about 10% by weight of the stucco, e.g., about 0.3 wt. % to about 7 wt. %, e.g., about 0.5 wt. % to about 6 wt. %.

Discharge conduit is downstream of the main mixer body and can be in the form of, e.g., a gate-canister-boot arrangement as known in the art, or an arrangement as described in U.S. Pat. Nos. 6,494,609 and 6,874,930. In some embodiments, the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1. Thus, in some embodiments the cementitious pre-mix of foam slurry (e.g., further comprising starch) can be added in the discharge conduit of the mixer (e.g., in the gate as described, for example, in U.S. Pat. Nos. 5,683,635 and 6,494,609) and/or in the main body if desired. Slurry discharged from the discharge conduit after all ingredients have been added, including cementitious foam slurry in accordance with embodiments of the invention, will form the board core. This board core slurry is discharged onto the moving face cover sheet.

Including starch in the pre-mix of foam and adding the foam in a discharge conduit downstream of the main mixing chamber of a pin mixer (i.e., a post-mixer introduction) presents significant advantages in accordance with embodiments of the invention. For example, starch increases water demand because of a viscosity buildup. By including the starch with the pre-mix of foam and delivering the starch downstream of the main mixing chamber, the effect of starch on water demand is desirably delayed. If the viscosity increase caused by the starch is delayed until the slurry is close to being laid down on a cover sheet as is common, the negative effect of increased water demand is significantly reduced or eliminated. Surprisingly, the post-mixer addition of cementitious foam slurry, including starch, results in adequate uniform dispersion of the starch into the slurry and hence in the resulting product core.

For example, in accordance with embodiments of the invention, the gypsum board can be formed at a density of about 40 pcf or less, but preferably the gypsum board is made to be a lightweight product having a density of about 35 pcf or less, such as about 20 pcf to about 35 pcf, about 27 pcf to about 35 pcf, about 24 pcf to about 34 pcf, about 27 pcf to about 34 pcf, about 30 pcf to about 34 pcf, about 24 pcf to about 32 pcf, or about 27 pcf to about 32 pcf. The gypsum board desirably has sufficient strength even at lower densities in accordance with embodiments of the invention. For example, in various embodiments, when the board is cast at a thickness of about ½ inch, the board has a nail pull resistance of at least about 65 lb (e.g., at least about 68 lb, at least about 72 lb, at least about 75 lb, at least about 77 lb, etc), a core hardness of at least about 11 lb, and/or a flexural strength of at least about 36 lb in a machine direction, and/or about 107 lb in a cross-machine direction.

In another illustrative embodiment, the particle stabilized foam technique of the invention is used in foaming fly ash systems, including Class F fly ash, Class C fly ash, and combinations thereof. The present invention presents a considerable advantage in reducing density in fly ash containing construction products, since fly ash has proven to be difficult to foam due to the presence of residual carbon in the fly ash that tends to collapse the foam. Such fly ash slurries can include other components well known in fly ash systems including, for example, hydraulic cements such as Portland cement, pozzolanic materials such as silica fume, slag, rice hush ash, volcanic ash, metakaolin, perlite, pumice, crushed glass, diatomite, etc. The fly ash mixture compositions of the invention can also contain various fillers including sand (e.g., in about a 50/50 mixture, etc., by weight of sand and fly ash), aggregate, lightweight aggregate, calcium carbonate, etc. The foam is surprisingly maintained despite the presence of such other ingredients.

The following examples further illustrate the invention but, of course, should not be construed as in any way limiting its scope.

In the following examples, unless otherwise indicated, the various solid particles were foamed in a Hobart mixer using a whisk to introduce air into the slurry.

Example 1

This Example illustrates the foaming of stucco (in the form of the beta calcium sulfate hemihydrate) with particle stabilization technique in accordance with embodiments of the invention.

To form a cube of gypsum (calcium sulfate dehydrate), the beta form of stucco ("beta stucco") and water are reacted in a slurry to hydrate the stucco and form the gypsum. To reduce density in the cube by forming foam, the slurry also included surface modifying agent. In preliminary evaluations, different surface modifying agents were tested, including valeric acid, hexylamine, and gallate species in the form of propyl gallate. The valeric acid and hexylamine were unsuccessful in forming any stable foam, while the propyl gallate was found to be successful. Even with propyl gallate, foaming was not successful until slurry pH was increased.

In the series of tests, 500 g of stucco, 500 g of water, 1 g of heat resistant accelerator (HRA), 1.2 mL of 50% sodium hydroxide (NaOH) solution in water, and various amounts of propyl gallate were combined in a Hobart mixer to form a series of slurries. Each slurry was mixed with a whisk for a time period from 30 seconds to two minutes to form air bubbles, with the resultant foamed slurry cast in a 2 inch by 2 inch by 2 inch cube. The temperature rise set (TRS) was measured to assess hydration.

Figure 2:
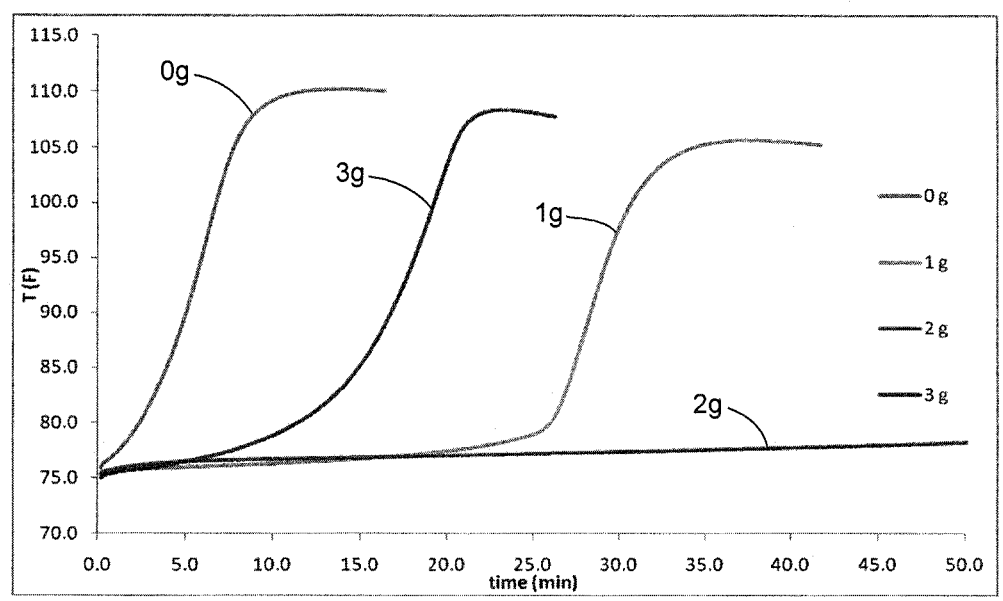
FIG. 2 is a plot of temperature (° F.) vs. hydration time (minutes) illustrating the effect of various amounts of propyl gallate included in a slurry on the hydration time for forming a gypsum cube in test series described in Example 1, in accordance with embodiments of the invention.

The results can be seen in FIGS. 1 and 2. As seen in FIG. 1, the effect of the amount of surface modifying agent in the form of propyl gallate on the cube density of the produced gypsum was evaluated. The density of the cube decreased with increasing amounts of propyl gallate. For example, a core density of about 29 pcf, exemplifying a relatively light product, was achieved with 3 g of propyl gallate per 500 g stucco at the stated amount of NaOH and with the whisking type of air introduction. It has been found that whisking is more suitable than a paddle for producing the foam because the whisking creates a turbulence action which is desirable in that it generates lots of small bubbles.

FIG. 2 illustrates the effect of the amount of propyl gallate on hydration time. The addition of 1 g of propyl gallate retarded the set by about 25 minutes, while the use of 2 g of propyl gallate took more than 2 hours, while the use of 3 g of propyl gallate retarded the set by only 10 minutes.

Example 2A

Examples 2A and 2B illustrate the foaming of smaller quantity of cementitious particles, in the form of heat resistant accelerator (HRA), with particle stabilization technique, and adding the foamed material into stucco slurry, in accordance with embodiments of the invention. Since HRA already comprises calcium sulfate dihydrate, it does not set upon addition of water.

In preliminary evaluations, the proper amount of propyl gallate required to foam 10 g of HRA in 100 g water was determined to be desirably in the range from about 0.15 g to about 0.45 g of propyl gallate. 0.3 g was selected for the tests. Various amounts of NaOH were also considered to identify a minimum amount to adjust the pH suitably to achieve optimum surface modification and foaming results.

The effect of pH on foaming 10 g of HRA in 100 g water was evaluated. The pH of slurry of 10 g HRA in 100 g water was about 7.4, while adding 0.3 g propyl gallate dropped the pH to 6.7. As seen in Table 1 below, to foam 10 g of HRA, 0.4 mL of 10% solution of NaOH in water was identified.

TABLE 1

| NaOH (ml) | Slurry pH | Notes |
|---|---|---|
| 0 | 6.7 | No Foam |
| 0.1 | 7.2 | Partially foamed* |
| 0.2 | 7.5 | Partially foamed* |
| 0.3 | 7.65 | Completely Foamed. Foam density is 0.1 g/ml |
| 0.4 | 7.8 | Completely Foamed. Foam density is 0.06 g/ml |

*Only part of the slurry was foamed and a significant amount of liquid was noticed under the foam.

As seen from the results, a pH of about 7.5 and greater is desirable to foam slurry of HRA. Without the proper pH value, the slurry can partially foam or completely foam but with a high foam density. But with the appropriate pH value, the foam density can be as low as 0.06 g/mL or 3.7 pcf with a range from about 3 pcf to about 50 pcf being desired in accordance with embodiments of the invention Example 2B To investigate the effect of foam water on foam efficiency, 10 g of HRA, 0.3 g propyl gallate, and 0.4 mL of 10% NaOH solution were added to various amounts of water to form slurry. The slurry was mixed for about 0.5 to 3 minutes until foamed. The foam was then added to a bowl containing 500 g stucco and different amounts of water such that the final water/stucco ratio was 1.0. The foamed slurry was used to cast cubes for density measurements. Table 2 below sets forth the effect of the amount of foam water on cube dry density.

TABLE 2

| Foam water (g) | Cube dry density (PCF) |
|---|---|
| 250 | 21 |
| 150 | 17 |
| 100 | 17 |
| 75 | 20 |
| 50 | 30 |

As seen from Table 2, when the amount of water is too high, the produced foam is less stable. It is noted that the foam volume depends on the "HRA/foam water" ratio in addition to the amount of propyl gallate and pH. It is to be noted that HRA/foam water ratio is in a range from about 0.04 to about 0.5 (e.g., about 0.35) is desired in accordance with some embodiments of the invention.

Example 3

This Example compares the effect of foaming particles in accordance with embodiments of the particle stabilizing foaming technique of the invention versus other techniques for reducing product density, particularly the use of surfactant foam and the use of a high water/stucco ratio (WSR) to introduce high evaporated water void content for bringing product density down.

Figure 3:
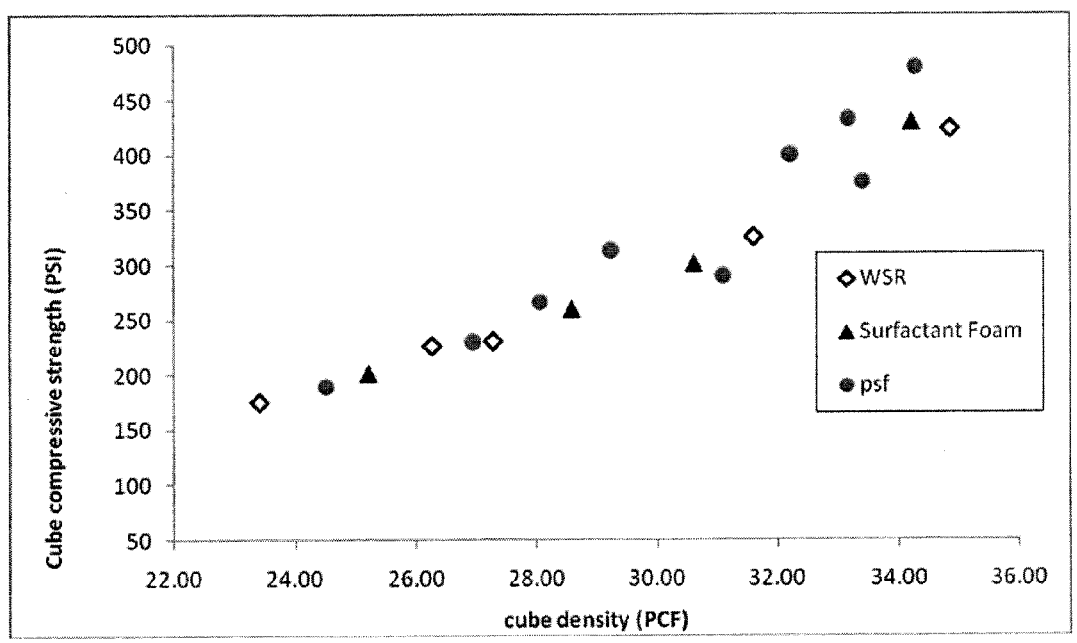
FIG. 3 is a plot of cube compressive strength (psi) vs. cube density (pcf), which was varied by using particle stabilized foam in accordance with embodiments of the invention in comparison with density reductions created by water/stucco ratio (WSR) increases and the use of surfactant foam for comparison purposes, as described in Example 3.

FIG. 3 is a plot of the cube compressive strength (psi) vs. cube density (pcf) for cubes prepared using the particle stabilized foam of embodiments of the invention compared to cubes prepared using regular surfactant foam and different WSR. Experimental conditions were 1.5% HRA, 2% pregelatinized corn starch, 0.5% Daxad 19 dispersing agent, and 3 drops Versenex 80 diethylenetriaminepentaacetic acid based chelating agent. The WSR was fixed at 1.0 when surfactant foam or particle stabilized foam was used.

As seen in FIG. 3, using the particle stabilized foam presents similar cube strength results as seen from using surfactant foam and increased WSR.

Example 4

This Example illustrates the high foam stability exhibited by particle stabilized foam in accordance with embodiments of the invention. This Example also illustrates that starch can be added with foam in an HRA slurry, which is a surprising and unexpected result of the invention.

An experiment was performed to determine whether an HRA stabilized foamed slurry could carry starch without destabilizing the foam and to determine the relative effect on cube compressive strength, compared with starch addition separately into the stucco slurry. Experimental conditions were as follows: 400 g stucco, 6 g HRA, 8 g of pregelatinized starch, 2 g sodium neutralized anionic dispersing agent, commercially available as Daxad 19 (Geo Specialty Chemicals), and 3 drops Versenex 80 diethylenetriamine-pentaacetic acid based chelating agent, WSR of 1, 0.3 propyl gallate, and 0.4 mL of 10% NaOH. A foaming mixture was formed by mixing HRA, foam water, propyl gallate, NaOH, and dispersant. The pregelatinized starch was premixed with water first and added to the foaming mixture or to the stucco slurry as a solution. Upon addition of the foam slurry to the stucco slurry, the foam-slurry mixture was mixed using a Hobart mixer with a paddle speed of 2 for 30 seconds. The results are set forth in Table 3 below and FIG. 4.

TABLE 3

| Foam water (g) | Pregelatinized Corn Starch in foam (g) | Pregelatinized Corn Starch in mix (g) | Dry cube density (PCF) | Cube compressive strength (PSI) |
|---|---|---|---|---|
| 80 | 8 | 0 | 33.2 | 433 |
| 100 | 8 | 0 | 21.1 | 137 |
| 80 | 6 | 2 | 29.2 | 313 |
| 95 | 6 | 2 | 28.0 | 266 |
| 80 | 4 | 4 | 26.9 | 230 |
| 60 | 4 | 4 | 33.4 | 376 |
| 60 | 2 | 6 | 32.2 | 400 |
| 90 | 2 | 6 | 34.3 | 480 |
| 80 | 0 | 8 | 36.8 | 583 |
| 150 | 0 | 8 | 24.5 | 190 |

Figure 4:
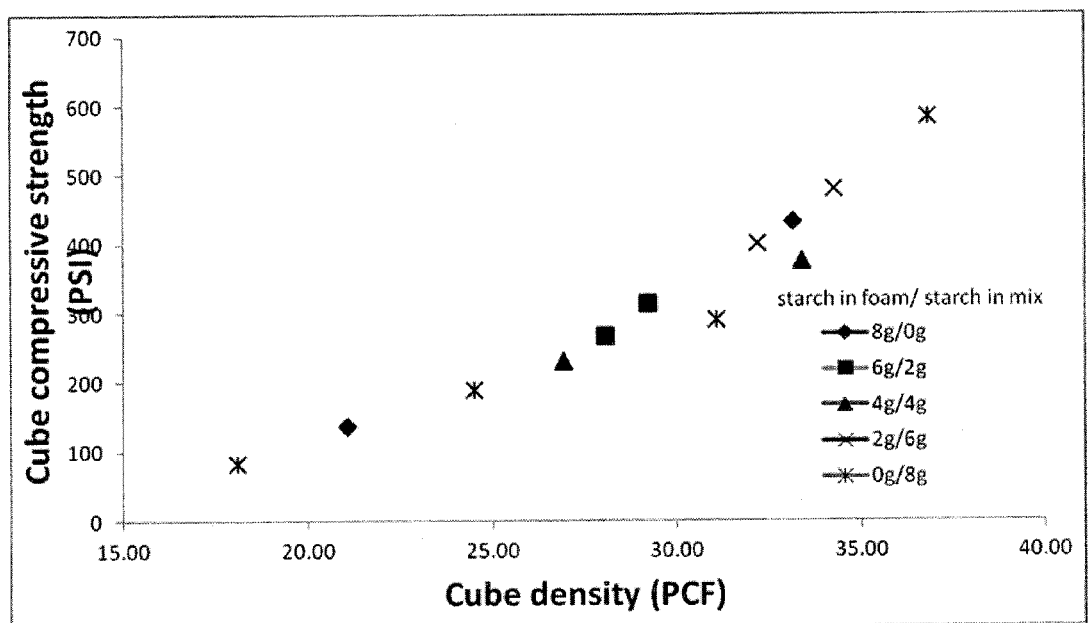
FIG. 4 is a plot of cube compressive strength (psi) vs. cube density (pcf) which illustrates that starch can be included with particle stabilized foam delivery into a stucco slurry system in test series described in Example 4, in accordance with embodiments of the invention.

FIG. 4 demonstrates the cube compressive strength vs. density curve. As seen from FIG. 4, the results show that adding pregelatinized starch in the HRA foam slurry does not result in any adverse effect on cube compressive strength compared with starch introduction into stucco slurry separate from the foam. This Example indicates that, surprisingly, the starch did not have an appreciable foam de-stabilizing effect when included with the HRA/surface modifier agent slurry, and that upon addition to the stucco slurry, the components in the stucco slurry also did not appreciably have a de-foaming effect.

Example 5

This Example illustrates the foaming of HRA using foam generator. As noted above, the solid particles were foamed in a Hobart mixer using a whisk to introduce air into the slurry in the previous Examples. The same formulation used to test foaming for HRA in Example 2B was tested in a foam generator where the amount of air was varied.

Foam was successfully produced with the expected density. It was found that there were some occasional blockage issues in the foam generator since the foam generator was not designed for the slurry that was tested.

Example 6

This Example illustrates the foaming additional solid particles with particle stabilization technique in accordance with embodiments of the invention. More particularly, fly ash, Portland cement, alpha calcium sulfate hemihydrate ("alpha stucco"), synthetic gypsum, and landplaster were all evaluated. All of these materials were successfully foamed using propyl gallate as discussed above.

It is to be noted that, with Portland cement and fly ash, it was found that there was no need for additional pH boost since the pH is already believed to be sufficiently high for these materials. As for alpha stucco, landplaster, and synthetic gypsum, the foaming procedure was the same as the case for the foaming described above relative to beta stucco and HRA in Examples 1 and 2. It has also been found that it is possible to foam any combination of the aforesaid materials.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A foamed slurry for forming a product, the slurry comprising:
   (a) water;
   (b) cementitious particles, wherein the cementitious particles comprise stucco, calcium sulfate dihydrate, coated calcium sulfate dihydrate, or combinations thereof;
   (c) air bubbles with walls formed by the water; and
   (d) surface modifying agent effective to modify a surface of at least some of the cementitious particles, such that the modified particles stabilize the air bubbles sufficiently to form air voids in the product,
   wherein the surface modifying agent comprises one or more gallate compound of Formula I:

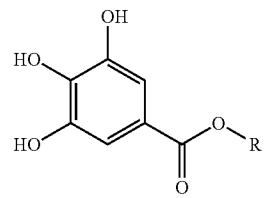

(Formula I)

wherein R is selected from the group consisting of $C_1$-$C_{10}$ alkyl, $C_1$-$C_{10}$ alkenyl, $C_1$-$C_{10}$ alkynyl, $C_3$-$C_{12}$ cycloalkyl, $C_3$-$C_{12}$ cycloalkenyl, or $C_6$-$C_{10}$ aryl, wherein the alkyl, alkenyl, and alkynyl groups are branched or unbranched, and optionally substituted with one or more substituents selected from the group consisting of halo, alkoxy, ester, or substituted amide, wherein the foamed slurry has a pH of about 7.5 to about 9.

2. The foamed slurry of claim 1, wherein the slurry comprises about 0.015 wt. % or less of detergent surfactant.

3. The foamed slurry of claim 1, wherein R is characterized as $C_1$-$C_6$ alkyl, $C_1$-$C_6$ alkenyl, $C_1$-$C_6$ alkynyl, $C_3$-$C_8$ cycloalkyl, $C_3$-$C_8$ cycloalkenyl, $C_6$-$C_8$ aryl, wherein the alkyl, alkenyl, and alkynyl groups are branched or unbranched, and optionally substituted with one or more substituents selected from the group consisting of halo, alkoxy, ester, or substituted amide.

4. The foamed slurry of claim 1, wherein R is $C_1$-$C_6$ alkyl.

5. The foamed slurry of claim 1, wherein the surface modifying agent is propyl gallate.

6. The foamed slurry of claim 1, wherein the surface modifying agent is present in an amount from about 0.1% to about 7% by weight of the cementitious particles.

7. The foamed slurry of claim 1, further comprising starch in an amount from about 0.1% to about 10% by weight of the cementitious particles.

8. The foamed slurry of claim 1, wherein the slurry further comprises starch.

* * * * *